US007454906B2

(12) United States Patent
Kauss et al.

(10) Patent No.: US 7,454,906 B2
(45) Date of Patent: Nov. 25, 2008

(54) HYDRAULIC CONTROL SYSTEM

(75) Inventors: Wolfgang Kauss, Francheville (FR); Vincent Guyard, Villeurbanne (FR)

(73) Assignee: Bosch Rexroth AG, Stuttgart (DE)

( * ) Notice: Subject to any disclaimer, the term of this patent is extended or adjusted under 35 U.S.C. 154(b) by 285 days.

(21) Appl. No.: 10/580,715

(22) PCT Filed: Nov. 19, 2004

(86) PCT No.: PCT/DE2004/002565

§ 371 (c)(1),
(2), (4) Date: Aug. 21, 2006

(87) PCT Pub. No.: WO2005/052268

PCT Pub. Date: Jun. 9, 2005

(65) Prior Publication Data

US 2007/0130934 A1 Jun. 14, 2007

(30) Foreign Application Priority Data

Nov. 27, 2003 (DE) ................................ 103 55 329

(51) Int. Cl.
*F16D 31/02* (2006.01)

(52) U.S. Cl. ........................................... 60/469; 60/468

(58) Field of Classification Search ................... 60/468, 60/469; 91/399
See application file for complete search history.

(56) References Cited

U.S. PATENT DOCUMENTS

| | | | | |
|---|---|---|---|---|
| 6,474,064 | B1 | 11/2002 | Heyne et al. | |
| 6,499,296 | B1 | 12/2002 | Weickert et al. | |
| 6,666,125 | B2 * | 12/2003 | Gunzenhauser | 60/469 |
| 6,941,687 | B2 * | 9/2005 | Sharkness et al. | 60/469 |

FOREIGN PATENT DOCUMENTS

| | | | |
|---|---|---|---|
| DE | 38 23 840 | C2 | 1/1989 |
| DE | 41 38 208 | C2 | 5/1993 |
| DE | 42 31 399 | A1 | 2/1994 |
| DE | 42 42 448 | C1 | 3/1994 |
| DE | 198 33 489 | A1 | 1/1999 |
| DE | 199 04 616 | A1 | 8/2000 |
| DE | 199 13 277 | A1 | 9/2000 |
| DE | 199 13 784 | A1 | 9/2000 |
| EP | 0 603 421 | A1 | 6/1994 |
| JP | A 8-312602 | | 11/1996 |

* cited by examiner

*Primary Examiner*—Michael Leslie
(74) *Attorney, Agent, or Firm*—Oliff & Berridge, PLC

(57) ABSTRACT

What is disclosed is a hydraulic control system for controlling a hydraulic consumer actuating a working tool of a mobile equipment that is provided with oscillation damping means for attenuating oscillations during braking of the working tool. In accordance with the invention, the oscillation damping means comprise two pilot-controlled shut-off valves arranged in opposite directions, that are positioned in a connecting line between a pressure medium supply and a pressure medium drain. The shut-off valves are subjected to the pressure in the drain and in the delivery, respectively, in the opening direction, and also to this pressure and to the force of a spring in the closing direction. Following a predetermined initial stroke of a regulator of the control system, the pressure acting on the drain-side shut-off valve in the closing direction may be reduced, so that the latter is opened by the pressure in the drain, and the connecting line between delivery and return is opened.

12 Claims, 4 Drawing Sheets

HYDRAULIC CONTROL SYSTEM

The invention concerns a hydraulic control system for actuation of a working tool of a mobile equipment in accordance with the preamble of claim 1.

Such control systems are used, e.g., in excavators, backhoe loaders, for actuating a boom and a shovel linked to it. Actuation of these working tools takes place with the aid of hydraulic cylinders whose pressure chambers are adapted to be connected with a variable displacement pump or with a tank via a control block. One problem with such working machines resides in the fact that at the end of a movement of the working tool, its comparatively large mass must be braked. Thus, for example, in the event of lateral pivoting of a boom of a backhoe loader about a vertical axis, oscillations occur at the end of the pivoting movement which make it difficult for the driver to take the shovel into the position desired by him.

These oscillations are caused by the kinetic energy to be dissipated during the braking process, whereby the hydraulic cylinders of the equipment are subjected to a force acting opposite to the direction in which the hydraulic cylinders are acted upon during the pivoting movement. An oscillation is produced which persists until the kinetic energy inside the hydraulic system is dissipated.

In order to avoid such oscillations, U.S. Pat. No. 6,474,064 B1proposes an oscillation damping module wherein the pressure building up during braking of the working tool may be dissipated in a drain line between the hydraulic cylinder and the control block via a valve arrangement to a low-pressure side, in the present case to a delivery line between the control block and the hydraulic cylinder. Hereby the pressure difference in the delivery and in the drain is reduced, so that the oscillations mentioned at the outset are attenuated.

The valve arrangement of the oscillation damping module as employed in U.S. Pat. No. 6,474,064 B1 has an attenuation valve connecting the delivery and drain lines, which is biased in the closing direction by means of a spring, and whose oppositely acting control chambers may be subjected to a pressure difference corresponding to the pressure drop across a check valve that is disposed in the delivery line or in the drain line, respectively.

As long as the working tool is accelerated or moved at a constant velocity, this attenuation valve is acted on in the direction of its closed position by the pressure difference across the shut-off valve of the delivery. During braking of the boom, and when the afore-described reaction forces manifest, the attenuation valve is taken by the pressure drop generated in the pressure medium drain across the check valve disposed therein into an open position in which the pressure medium delivery and the pressure medium return are connected with each other—the oscillations are attenuated and eliminated very quickly.

It is a drawback in this known solution that a considerable complexity in terms of apparatus is necessary, for both in the delivery and in the return line two check valves and the attenuation valve associated to the two lines must be provided and interconnected via a complex configuration of passages.

In contrast, the invention is based on the object of furnishing a hydraulic control system for controlling a working tool of a mobile equipment, whereby the generation of oscillations during braking of the equipment may be avoided, or at least limited to an acceptable degree, at minimum complexity.

This object is achieved through a hydraulic control system having the features of claim 1.

In accordance with the invention, the hydraulic control system comprises oscillation damping means for attenuating the afore-mentioned oscillations, with two pilot-controlled shut-off valves arranged in opposite directions that are disposed in a connecting line between the pressure medium delivery and drain. The shut-off valves are subjected to the pressure in the drain or in the delivery, respectively, in the opening direction and also to this pressure as well as to the force of a spring in the closing direction. Following a predetermined stroke of a regulator of a directional control valve controlling the pressure medium flow to and from the consumer, only the tank pressure or a comparable low pressure continues to act on the drain-side shut-off valve in the direction of closing, so that the increased pressure in the drain is sufficient to open the shut-off valve against the force of the spring and against the low pressure now acting, so that the pressure between the delivery and drain lines may be balanced and the mentioned oscillations may be attenuated.

The means in accordance with the invention comprising two pilot-controlled shut-off valves (or similarly acting valve arrangements) have an extremely simple construction and may therefore be manufactured more simply and at a lower cost than the afore-described constructions.

In order to attenuate pressure fluctuations, an attenuation nozzle may be provided in the connecting line between the two shut-off valves.

The hydraulic control system in accordance with the invention has a particularly compact structure if the two shut-off valves are integrated into the regulator, so that retrofitting of already existing installations by exchanging the regulator is made possible.

In such solutions it is preferred if the regulator has an axial bore which forms the connecting line and in which the two shut-off valves are inserted.

In an advantageous variant, this axial bore is enlarged on both sides into spring chambers for a spring of the respective shut-off valve by means of a radial shoulder which forms a valve seat for a valve body of the shut-off valve.

The valve body of the shut-off valve is advantageously executed with an area difference, wherein the annular surface that is effective in the opening direction may be subjected to the drain pressure.

The configuration of passages is particularly simple if the spring chamber of the shut-off valve is adapted to be connected with the tank port or with a low-pressure side via respective jacket recesses of the regulator after a predetermined stroke, so that following this stroke the spring chamber is relieved of pressure, and the forces acting on the closing body in the closing direction are reduced correspondingly.

In a preferred variant, the valve body has the form of a hollow piston and has in a radially set-back range of a piston jacket a nozzle transverse bore cooperating with radial bores of the regulator so as to apply the pressure in the drain to the spring chamber.

The stroke of the valve body of the shut-off valve may be limited by a stop sleeve inserted into the regulator.

In one exemplary embodiment of the invention, a nozzle is formed in the jacket of the regulator whereby the pressure in the drain may be applied to the spring chamber of the drain-side shut-off valve. This nozzle is closed after an initial stroke of the regulator. Owing to this measure, the drain-side shut-off valve is held closed by the pressure acting in the drain although its spring chamber is connected with the tank chamber via the jacket recess, so that the connecting line in accordance with the invention can not be opened in the event of a small stroke of the regulator. Hereby it is possible, e.g., to prevent the boom of a mobile excavator in a sloping environment from an outward movement owing to its own weight although it is actuated in the opposite direction (by a small movement of the regulator). This nozzle is mounted in parallel with the nozzle bore and may be closed by the valve body of the shut-off valve.

In an advantageous embodiment the closing movement of the valve bodies of the shut-off valves is attenuated in that the play between valve body and a guidance is designed to be relatively narrow.

Further advantageous developments of the invention are subject matter of further subclaims.

In the following, a preferred embodiment of the invention shall be explained in more detail by referring to schematic drawings, wherein.

Figure 1:
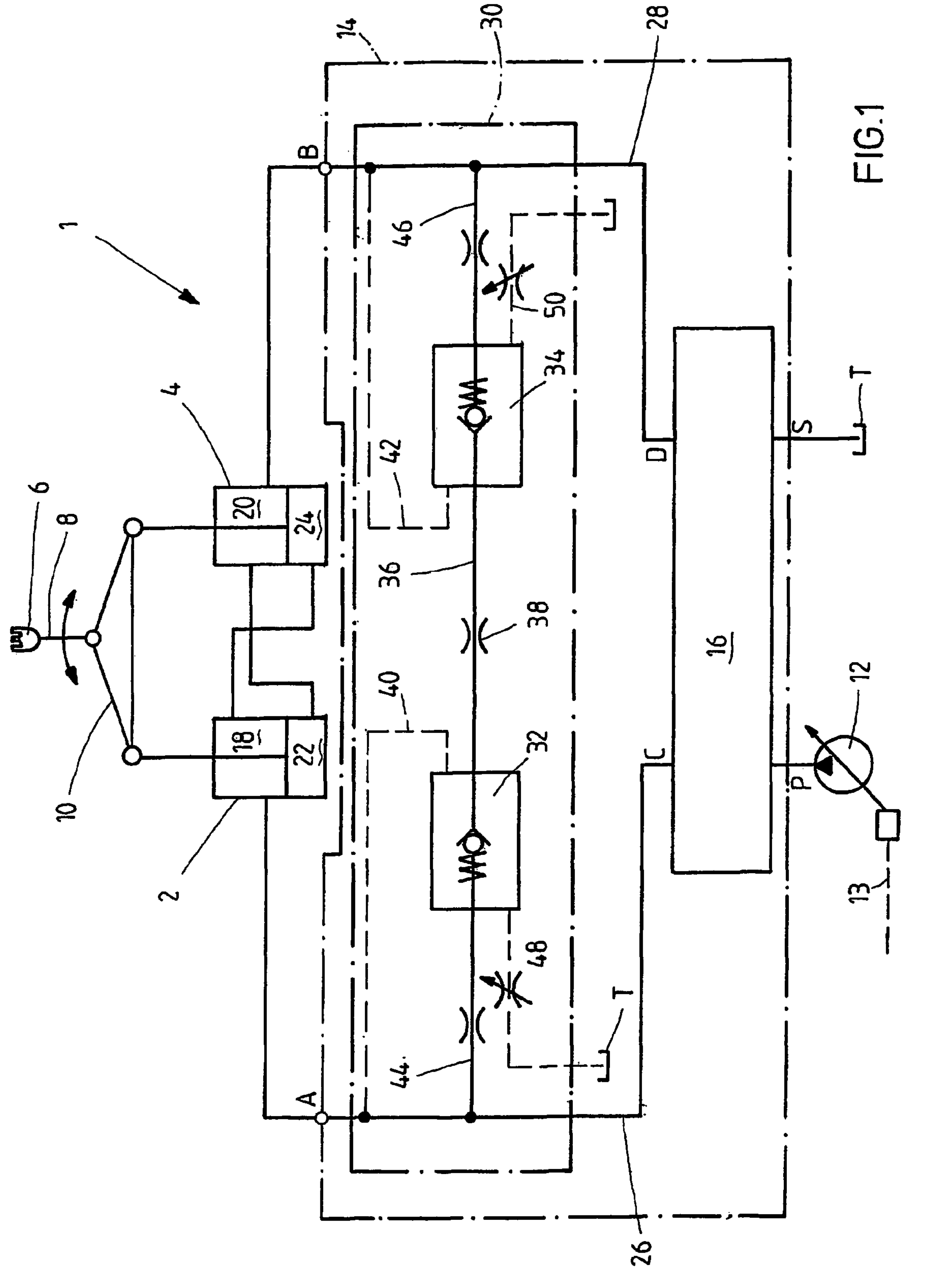
FIG. 1 is a switching diagram of a control system in accordance with the invention.

FIG. 1 shows a switching diagram of a control system 1 whereby pivoting cylinders 2, 4 of a mobile equipment, e.g., of a backhoe loader, may be controlled in order to pivot its boom 8 carrying a shovel 6 in a horizontal direction, i.e., in parallel with the ground (plane of drawing in FIG. 1). These pivoting cylinders 2, 4 are supported in the horizontal direction on the frame of the backhoe loader in an adjacent position and act on the boom 8 through the intermediary of a linkage assembly 10.

The pressure medium supply of the two pivoting cylinders 2, 4 is controlled with the aid of a control block whereby the pressure chambers of the pivoting cylinders 2, 4 may be connected with a variable displacement pump 12 or with a tank T.

The control block consists of a number of valve discs, from among which one valve disc 14 is associated to the two pivoting cylinders 2, 4, whereas the other valve discs are associated to further consumers of the backhoe loader, e.g., to the pivoting cylinder for the shovel, the pivoting cylinder for pivoting the boom in a vertical direction, the rotating gear drive mechanism, etc. The basic construction of such a control block is described in the Applicant's R&D data sheet having the No. RD 64 127, so that it is presently only necessary to deal with the elements that are essential for the invention.

The valve disc 14 forming the control system in accordance with the invention consists essentially of an LS ("Load-Sensing") directional control valve arrangement 16 comprising a proportionally adjustable directional control valve, whereby the direction of pressure medium flow and the pressure medium velocity may be adjusted. This directional control valve constitutes a meter-in orifice to which a pressure compensator of the LS directional control valve arrangement is associated. In LS systems having downstream pressure compensators it is achieved that at a sufficiently supplied pressure medium quantity a particular pressure difference across the meter-in orifices exists independently of the load pressures of the hydraulic consumers, so that the pressure medium velocity is independent of the individual load pressure of the consumer. The highest load pressure of the consumers controlled through the intermediary of the control block is tapped via an LS line 13 including shuttle valves and conducted to a pump regulator of the variable displacement pump 12, so that the latter delivers a pump pressure that exceeds the highest load pressure by a predetermined pressure difference at a sufficient supply of all of the consumers. With regard to details of LS systems, reference is made to DE 199 04 616 A1.

The valve disc 14 has a pressure medium supply P and a pressure medium return S as well as two work ports A, B that are connected with the pivoting cylinders 2, 4. In the represented geometry, the work ports A, B are each connected with annular chambers 18, 20 of the pivoting cylinders 2, 4 which in turn are connected via diagonal lines with the cylinder chamber 22, 24 of the respective other pivoting cylinder 2, 4. The two work ports A, B of the valve disc 14 are connected via a delivery 26 or a drain 28, respectively, with the pivoting cylinders 2, 4. In order to attenuate the oscillations described at the outset, the valve disc 14 is executed to include oscillation damping means 30, as is indicated in FIG. 1 by a double-dotted line. These oscillation damping means 30 include two oppositely arranged, pilot-controlled shut-off valves 32, 34 that are disposed in a connecting line 36 connecting the delivery 26 with the drain 28. Between the two shut-off valves 32, 34 an attenuation nozzle 38 for attenuating high-frequency pressure fluctuations is formed.

The shut-off valves 32, 34 are each subjected to the pressure in the delivery 26 and in the drain 28, respectively, via a release passage 40, 42 in the opening direction and via a passage 44, 46 in the closing direction. As will be explained in more detail further below, a respective control chamber of the shut-off valves 32, 34 acting in the closing direction may be connected towards the tank T via load relieving means 48, 50. These load relieving means 48, 50 only open the connection towards the tank T following a predetermined initial stroke of a regulator of the LS directional control valve arrangement 16.

Figure 2:
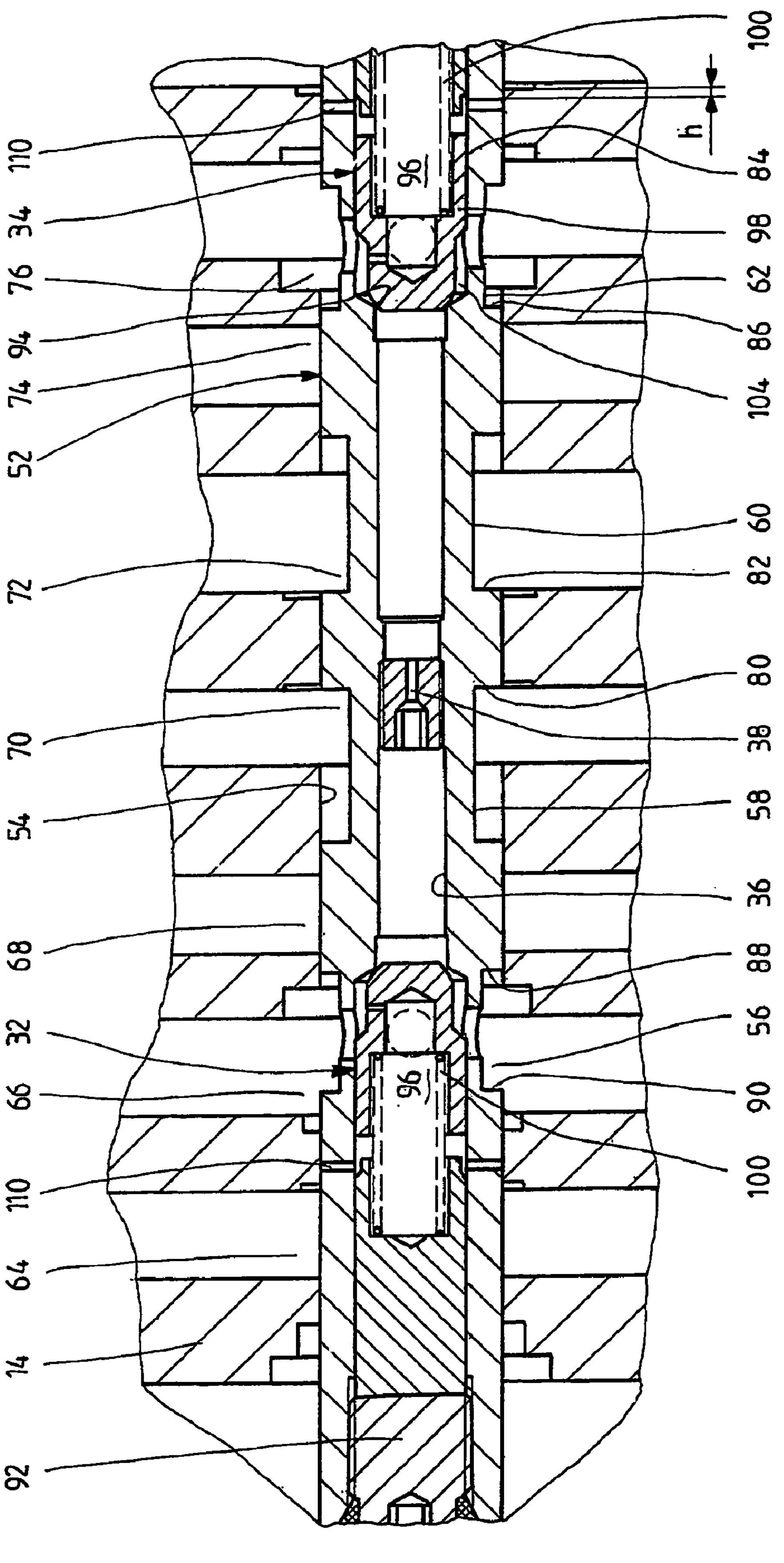
FIG. 2 is a sectional view of a proportional valve for a control system in accordance with FIG. 1.

In FIG. 2 a concrete development of the oscillation damping means 30 shall now be explained, where the latter is integrated into the regulator 52.

The valve disc 14 represented in a partial view includes a valve bore 54 in which the regulator 52 is guided in an axially displaceable manner. On the outer periphery of the regulator a delivery control groove 56, two connection control grooves 58, 60, and a drain control groove 62 are formed.

The valve bore 54 is enlarged in the radial direction into a tank chamber 64, a delivery chamber 66, a connecting chamber 68 arranged downstream of the LS pressure compensator (not shown), a pressure compensator chamber 70 arranged upstream of the LS pressure compensator, a supply chamber 72, a further connecting chamber 74 arranged downstream of the pressure compensator, a drain chamber 76, and another tank chamber 78.

At the adjacent annular end surfaces of the connection control groove 58 and of the connection control groove 60, control edges 80, 82 having fine control notches (not shown) are formed, whereby in the event of an axial displacement of the regulator 52 to the left or to the right in FIG. 2, a connection from the supply chamber 72 to the pressure compensator chamber 70 may be opened.

By means of two control edges 84, 86 formed by the drain control groove 62, the connection from the drain chamber 76 to the tank chamber 78 and to the connecting chamber 74, respectively, may be opened. The two control edges 88, 90 formed by the delivery control groove 56 open the connection from the delivery chamber 66 to the tank chamber 64 and from the connecting chamber 68 to the delivery chamber 66, respectively, in the event of an axial displacement of the regulator 52. All of the mentioned control edges are executed with fine control notches (also refer to the mentioned R&D data sheet).

The regulator 52 has an axial bore whereby the connecting line 46 in accordance with FIG. 1 is formed. In this connecting line 46 the shut-off valve 32 associated to the delivery and the shut-off valve 34 associated to the return are arranged. In the flow range between the shut-off valves 32, 34 in the connecting line 46 a nozzle body is inserted which forms the attenuation nozzle 38.

The end surface-side end portions of the connecting line 46 are each blocked by screw plugs 92 screwed into the regulator 52, with only the left screw plug 92 being represented in FIG. 2.

The two pilot-controlled shut-off valves 32, 34 have an identical construction which shall be explained below by referring to FIG. 3 which shows the shut-off valve 32 in an enlarged representation.

Accordingly, the connecting line 46 is enlarged stepwise in a direction towards its two end portions, so that a valve seat 94 and a connecting spring chamber 96 are formed. Against the valve seat 94 a valve body 98 having the form of a hollow piston is biased by means of a spring 100 which in turn is supported on a support sleeve 102 that is inserted in the spring chamber 96 and positionally fixed in the axial direction by the screw plug 92.

The valve body 98 is stepped back in a direction towards the valve seat 94, with its maximum external diameter corresponding to the diameter of the spring chamber 96, wherein the valve body 98 is stepped back in a direction towards the valve seat 94. The radially set-back portion 102 of the valve body 98 forms with the inner circumferential wall of the regulator 52 an annular pilot control chamber 104 that is connected with the delivery chamber 66 via radial bores 106 of the regulator 52.

In the radially set-back portion 102 of the valve body 98 a nozzle bore 108 is formed which merges into the inner space of the valve body 98, so that this nozzle bore 108 connects the pilot control chamber 104 with the spring chamber 96.

The jacket of the regulator 52 is provided with jacket recesses 110 that are covered in the represented basic position of the regulator 52 by an annular web 112 between the delivery chamber 66 and the tank chamber 64. During an axial displacement of the regulator 52 from this neutral position to the left these recesses 110 are opened, so that a connection of the spring chamber 96 with the tank chamber 64 is opened, and the valve body 98 is relieved of load in the opening direction. The opening cross-section of the nozzle bore 108 is substantially smaller than the one of the opened jacket recesses 110, so that the pressure medium flow rate draining towards the tank T is higher than the pressure medium flow rate arriving via the nozzle bore 108. The stop sleeve 101 is formed such that the rear side of the valve body 98 can not close the jacket recesses 110.

As was already mentioned, the structure of the pilot-controlled shut-off valve 34 is identical, so that explanations in this regard may be omitted.

In the represented basic position of the shut-off valves 32, 34 these are subjected in the closing direction to the force of the spring 100 and to the pressure in the delivery chamber 66 or in the drain chamber 76, respectively, and in the opening direction to the pressure in the connecting line 46 and to the pressure in the delivery chamber 66 or in the drain chamber 76, respectively, that acts on the annular end surface of the valve body. This annular end surface corresponds to the area difference between the valve seat and the greater external diameter of the valve body 98. The jacket recesses 110 (on the right in FIG. 2) of the regulator 52 are then blocked by the annular web 112, so that the pressure in the drain chamber 76 is present in the spring chamber of the shut-off valve 34.

It shall now be assumed that the boom 8 is being pivoted, with, e.g., the annular chamber 18 of the pivoting cylinder 2 and the cylinder chamber 24 of the pivoting cylinder 4 being supplied with pressure medium, and the other two pressure chambers 20, 22 being connected to the tank T, so that the boom 8 rotates to the left in the representation in accordance with FIG. 1.

To this end, the regulator 52 is subjected via a pilot control device to a control pressure difference so that it is displaced from the represented neutral position to the right (FIG. 2). As a result the connection from the supply chamber 72 to the pressure compensator chamber 70 is opened with the aid of the control edge 80, the pressure medium flows across the pressure compensator into the connecting chamber 68. By the control edge 88 its connection with the delivery chamber 66 is opened, so that the pressure medium may flow via the delivery chamber 66 and the work port A to the pressure chambers 18, 24 of the pivoting cylinders 2, 4. In the process, the pressure compensator adjusts itself into a regulating position in which the pressure drop across the meter-in orifice (opened cross-section between supply chamber 72 and pressure compensator chamber 70) is held constant independent of load pressure.

By the axial displacement of the regulator 52 to the right, the connection from the drain chamber 76 to the tank chamber 78 is furthermore opened, so that the pressure medium may drain from the pressure chambers 22, 20 of the pivoting cylinders 2, 4 to the tank T. The boom 8 is correspondingly displaced to the left while moving at a constant velocity. As the regulator 52 is displaced from its position as represented in FIG. 2 to the right, the jacket recesses 110 associated to the shut-off valve 32 are blocked by the annular web 112, so that the valve body 98 of the shut-off valve 32 is subjected in the closing direction to the delivery-side pressure, with the spring chamber 96 thereof (see FIG. 3) being connected via the radial bores 106 and the nozzle bore 108 with the delivery chamber 66.

The jacket recess 110 of the regulator 52 associated to the drain-side shut-off valve 34 is opened towards the tank chamber 78, so that the rear side of the valve body 98 of the shut-off valve 34 is relieved of load. Depending on pressure conditions in the drain, at a constant velocity of the boom 8 the valve body 98 of the shut-off valve 34 may also be raised from its valve seat 94 by the pressure in the drain chamber 76 acting on its annular end surface, so that the drain pressure is also present in the connecting line 36 to act on the valve body 98 of the shut-off valve 32 in the opening direction. At a constant boom velocity, however, the shut-off valve 32 remains in its closed position as the substantially higher supply pressure acts on the rear side.

As soon as the boom 8 has reached its desired pivoting position, the pilot control device is reset, and the boom 8 is braked correspondingly quickly. The boom attempts to move on owing to its inertia of mass, so that the pressure in the pressure chambers 22, 20 of the pivoting cylinders 2, 4 rises in accordance with the description given at the outset. This results in a rising pressure in the drain 28. This pressure also prevails in the pilot control chamber 104 at the right-hand end portion of the regulator 52 (see FIG. 2), so that the annular end surface of the shut-off valve 34 resulting from the area difference of the pilot control piston 98 is subjected to this increased drain pressure.

As long as the regulator 52 has not covered the initial stroke h indicated in FIG. 2, the rear side of the drain-side shut-off valve 34 is subjected to the pressure in the drain chamber 76, so that its valve body is biased into the closed position. Following the initial stroke h, which is as a general rule performed during a fast boom movement, the spring chamber 96 of the shut-off valve 34 is relieved of load via the jacket recesses 110 at the right-hand end portion of the regulator 52 towards the tank chamber 78, so that the valve body 98 of the shut-off valve 34 may be opened by the increased pressure in the drain chamber 76 on its annular end surface against the force of the spring 100, and the connecting line 46 is opened. The valve body 98 of the shut-off valve 32 (FIG. 3) is then subjected to the pressure in the drain chamber 76 in the opening direction, wherein the force of the spring 100 and the pressure in the supply chamber 66, which is lower than the pressure in the drain during braking, act in the closing direction. The pilot-controlled shut-off valve 32 also opens, so that a compensatory flow from the drain 28 to the delivery 26 takes place via the connecting line 46, and this pressure increase resulting in oscillations is dissipated very quickly.

As the regulator 52 is returned into its neutral position as represented in FIG. 2 for braking, the connection of the jacket recesses 110 with the tank chamber 78 is correspondingly also closed, so that the valve body 98 of the drain-side shut-off valve 34 is again subjected to the drain pressure in the closing direction. At the same time, the valve body 98 of the shut-off valve 32 would also be returned in its closing direction—the attenuation in accordance with the invention might not be carried out with the necessary effectivity. In order to prevent premature closing of the shut-off valves 32, 34, the closing bodies 98 are guided in the regulator 52 with a relatively narrow fit, so that solely due to this fit an attenuating effect is achieved and sealing of the spring chamber (96) is effected. An additional attenuation takes place through the attenuation nozzle 38 in the connecting line 36. The attenuation of the valve body closing movement of the shut-off valves 32, 34 is selected such that the closing movement is delayed until the mentioned oscillations during braking of the boom 8 are dissipated.

Following the reduction of the pressure increase in the drain 76, the shut-off valves 32, 34 are again returned into their closed positions, and the connecting line 46 is closed accordingly.

Figure 4:
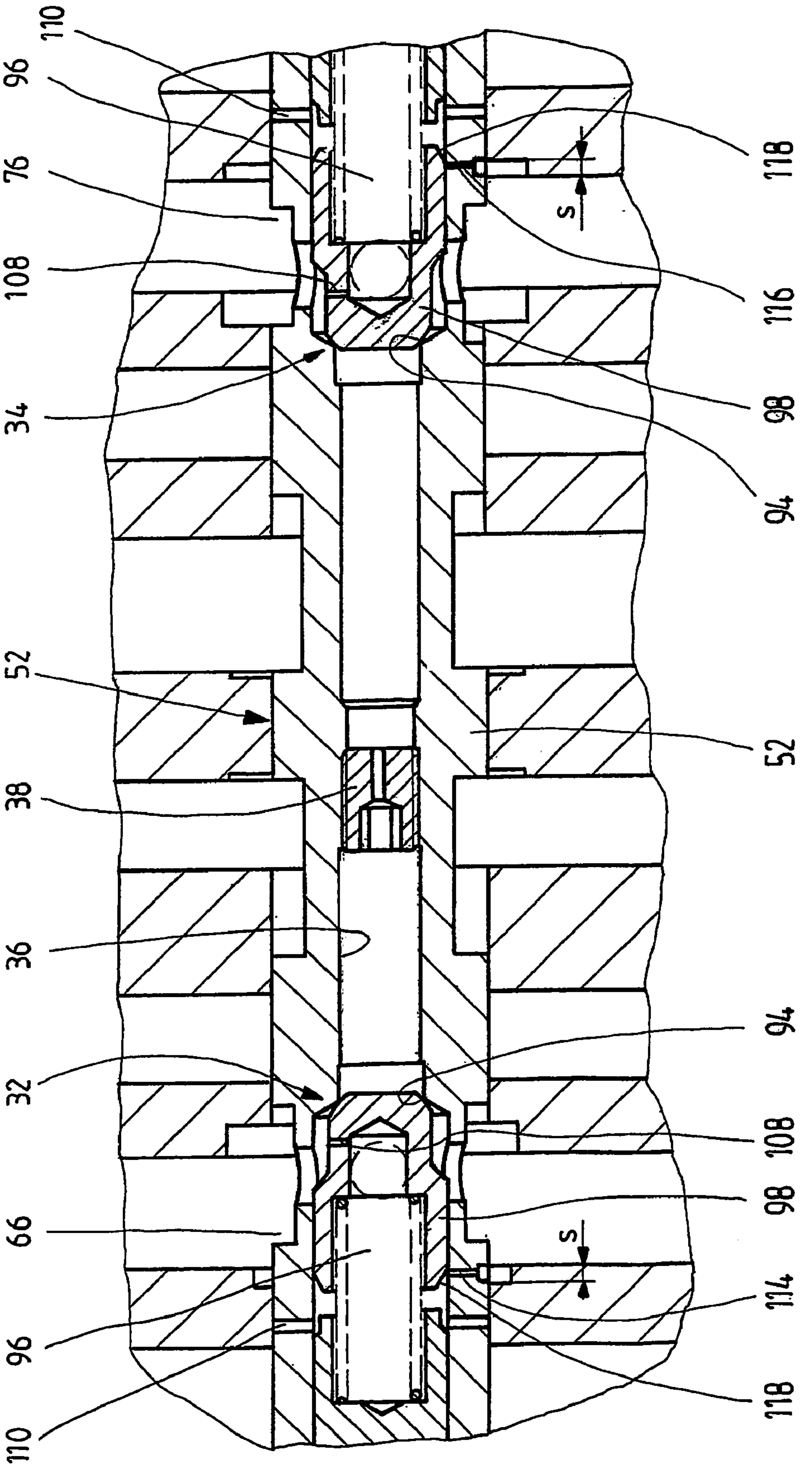
FIG. 4 is a detail representation of a directional control valve of another embodiment of a control system in accordance with the invention.

In order to prevent the connecting line 36 from being opened in the predetermined manner even at small movements of the regulator 52, i.e., in the event of rapid movements of the actuation lever of the pilot control device with a small amplitude, the control system in accordance with FIG. 4 may be modified. To this end, in the jacket of the regulator 52 two nozzles 114, 116 are provided whereby the respective spring chambers 96 of the shut-off valves 32, 34 are connected directly with the delivery chamber 66 and with the drain chamber 76, respectively. Upon a displacement of the regulator 52 to the right, the nozzle 116 in addition to the nozzle bore 108 connects the spring chamber 96 of the shut-off valve 34 with the drain chamber 76, so that due to the larger effective cross-section of connection, the drain-side shut-off valve 34 is kept closed despite the jacket recesses 110 having opened the connection to the tank. This drain-side nozzle 116 is closed in the event of an axial displacement of the regulator 52 following a particular stroke s (FIG. 4) that is greater than the afore-described stroke h, so that during the following stroke the shut-off valve 34 corresponds to the afore-described embodiment with regard to function. In the solution represented in FIG. 4, the rear-side end face of the valve body 98 is provided with a respective chamfer 118, so that the opening range of the nozzles 114, 116 is not covered in the closed position of the valve body 98.

At large movements of the regulator (stroke s) the nozzles 114, 116 have no effect or only a negligible effect inasmuch as they are closed while the regulator 52 is being moved, and during the above described attenuated closing movement of the valve bodies 98 of the shut-off valves 32, 34 they are closed by the chamfered rear side of the valve bodies 98 as long as these are raised from the valve seat 94. Only when the oscillations are reduced and the valve bodies 98 again contact their valve seat 94, these nozzles 114, 116 are again opened.

By means of the variant represented in FIG. 4 it is possible, e.g., to prevent the boom 8 from lowering down the slope in the event of a rapid movement of the regulator 52 with a small stroke and in a sloping environment of the backhoe loader, although the regulator 52 was controlled for the purpose of performing a boom movement up the slope. I.e., the effect of the attenuation device in accordance with the invention is overridden by the additional nozzles 114, 116 at small strokes of the regulator 52, and the oscillations described at the outset are accepted. These are, however, acceptable in the case of the rapid, short-stroke control movements, for the boom 8 then only performs correspondingly small movements.

Figure 3:
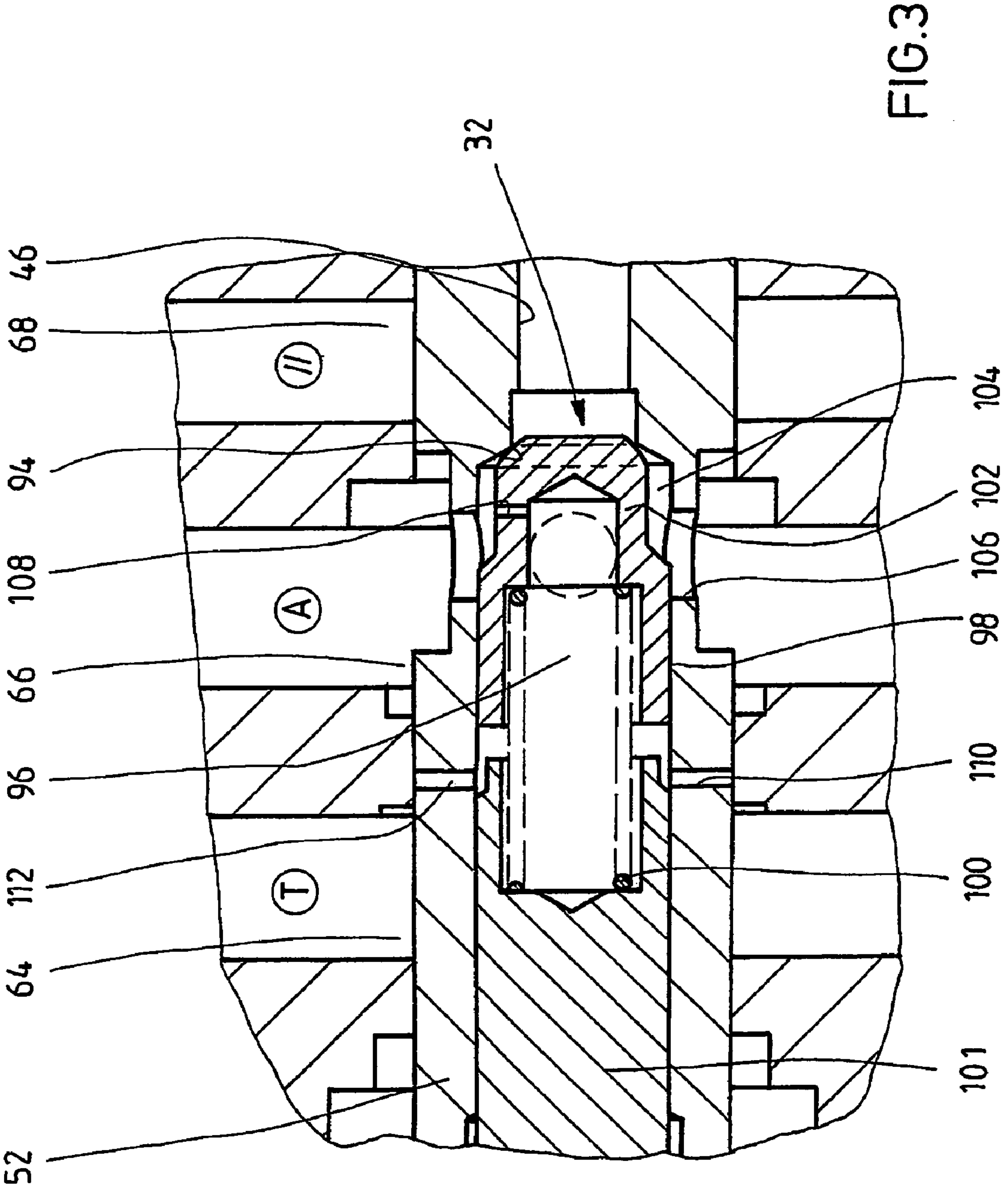
FIG. 3 is a detail representation of the proportional valves of FIG. 2.

The two load relieving means 48, 56 (in accordance with FIG. 1) are formed in the embodiments described in FIGS. 2, 3 and 4 by the jacket recesses 110 of the regulator 52, whereby the connections of the spring chamber 96 to the tank chamber 64 may be opened, and which are closed in the event of short strokes h of the regulator 52 out of its neutral position. The release passages 40, 42 indicated in FIG. 1 are in the concrete embodiments formed by the radial bores 106 and the pilot control chambers 104 whereby the annular end surfaces of the valve bodies 98 of the shut-off valves 32, 34, which act in the opening direction, are subjected to the pressure in the delivery 26 and in the drain 28, respectively.

What is disclosed is a hydraulic control system for controlling a hydraulic consumer actuating a working tool of a mobile equipment that is provided with oscillation damping means for attenuating oscillations during braking of the working tool. In accordance with the invention, the oscillation damping means comprise two pilot-controlled shut-off valves arranged in opposite directions, that are positioned in a connecting line between a pressure medium supply and a pressure medium drain. The shut-off valves are subjected to the pressure in the drain and in the delivery, respectively, in the opening direction, and also to this pressure and to the force of a spring in the closing direction. Following a predetermined initial stroke of a regulator of the control system, the pressure acting on the drain-side shut-off valve in the closing direction may be reduced, so that the latter is opened by the pressure in the drain, and the connecting line between delivery and return is opened.

LIST OF REFERENCE SYMBOLS

1 control system
2 pivoting cylinder
4 pivoting cylinder
6 shovel
8 boom
10 linkage assembly
12 variable displacement pump
14 valve disc
16 LS directional control valve arrangement
18 annular chamber
20 annular chamber
22 cylinder chamber
24 cylinder chamber
26 delivery
28 drain
30 oscillation damping means
32 shut-off valve
34 shut-off valve
36 connecting line 38 attenuation nozzle
40 release passage
42 release passage
44 passage
46 passage
48 load relieving means
50 load relieving means
52 regulator
54 valve bore
56 delivery control groove
58 connection control groove
60 connection control groove
62 drain control groove
64 tank chamber
66 delivery chamber
68 connecting chamber
70 pressure compensator chamber
72 supply chamber
74 connecting chamber
76 drain chamber
78 tank chamber
80 control edge
82 control edge
84 control edge
86 control edge
88 control edge
90 control edge
92 screw plugs
94 valve seat
96 spring chamber
98 valve body
100 spring
101 stop sleeve
102 set-back valve body
104 pilot control chamber
106 radial bores
108 nozzle bore
110 jacket recess
112 annular web
114 nozzle
116 nozzle
118 chamfer

The invention claimed is:

1. Hydraulic control system for controlling a hydraulic consumer actuating a working tool of a mobile equipment, comprising a control block, through a regulator of which a pump and a tank may be connected with a pressure medium delivery connected to the consumer or with a pressure medium-drain, and oscillation damping means whereby oscillations during stopping of the working tool may be attenuated by opening a connecting line between delivery and drain, characterized in that the oscillation damping means comprise two pilot-controlled shut-off valves arranged in opposite directions in the connecting line, whereby the connecting line may be opened when the pressure in the drain rises, wherein the shut-off valves may be subjected to the pressure in the delivery and in the drain, respectively, in the opening direction and also to this pressure and to the force of a spring in the closing direction, and wherein in a predetermined position of the regulator the drain-side shut-off valve may be subjected to the tank pressure or to another low pressure in the closing direction.

2. The control system in accordance with claim 1, wherein an attenuation nozzle is arranged in the connecting line between the shut-off valves.

3. The control system in accordance with claim 1, wherein the connecting line and the shut-off valves are integrated into the regulator.

4. The control system in accordance with claim 3, wherein the regulator has an axial bore wherein the shut-off valves are inserted.

5. The control system in accordance with claim 4, wherein the axial bore is enlarged on both sides into spring chambers for a spring of the respective shut-off valve, whereby a valve body is biased against a valve seat formed by a radial shoulder of the axial bore.

6. The control system in accordance with claim 5, wherein the valve body is executed with an area difference, so that an annular surface acting in the opening direction may be subjected to the drain pressure.

7. The control system in accordance with claim 5, wherein the regulator has jacket recesses whereby the connection between the spring chamber and a tank port may be controlled open following a stroke of the regulator.

8. The control system in accordance with claim 6, wherein the valve body is a hollow piston and has a nozzle bore, and the regulator has radial bores whereby the spring chamber may be subjected to the drain pressure.

9. The control system in accordance with claim 5, wherein the stroke of the valve body is limited by a stop sleeve.

10. The control system in accordance with claim 5, comprising two nozzles in the jacket of the regulator, whereby the spring chambers of the shut-off valves may be subjected to supply pressure and drain pressure, respectively, wherein the drain-side nozzle may be closed following an initial stroke of the regulator and/or by the valve body.

11. The control system in accordance with claim 8, wherein a nozzle in a jacket of the regulator and the nozzle bore are arranged in parallel.

12. The control system in accordance with claim 5, wherein the valve body is guided in the regulator in a close fit, so that the spring chamber is sealed along this guidance.

* * * * *